(12) United States Patent
Natsui

(10) Patent No.: US 11,604,717 B2
(45) Date of Patent: Mar. 14, 2023

(54) PROCESSOR PERFORMANCE MEASUREMENT APPARATUS AND PROCESSOR PERFORMANCE MEASUREMENT METHOD

(71) Applicants: Kabushiki Kaisha Toshiba, Tokyo (JP); Toshiba Electronic Devices & Storage Corporation, Tokyo (JP)

(72) Inventor: Yusuke Natsui, Yokosuka Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 27 days.

(21) Appl. No.: 17/007,541

(22) Filed: Aug. 31, 2020

(65) Prior Publication Data
US 2021/0286700 A1    Sep. 16, 2021

(30) Foreign Application Priority Data

Mar. 10, 2020   (JP) .............................. JP2020-040547

(51) Int. Cl.
*G06F 11/34*      (2006.01)
*G06F 11/30*      (2006.01)
*G06N 3/02*       (2006.01)

(52) U.S. Cl.
CPC ...... *G06F 11/3495* (2013.01); *G06F 11/3024* (2013.01); *G06F 11/3476* (2013.01); *G06N 3/02* (2013.01)

(58) Field of Classification Search
CPC ............. G06F 11/3495; G06F 11/3024; G06F 11/3476; G06N 3/02
See application file for complete search history.

(56) References Cited

U.S. PATENT DOCUMENTS 8,543,780 B2 * 9/2013 Suzuki ................ G06F 11/3414
                                                711/155
10,558,885 B2   2/2020 Kim et al.
(Continued)

FOREIGN PATENT DOCUMENTS

JP       11-212830 A    8/1999
JP        3292189 B2    6/2002
(Continued)

*Primary Examiner* — Bryan Bui
(74) *Attorney, Agent, or Firm* — Allen & Overy LLP

(57) ABSTRACT

A processor performance measurement apparatus according to an embodiment includes a processor, in which the processor detects that a memory access occurs, the memory access being required to execute processing units or execute execution units by a processor to be measured, performs first estimation for estimating switching of the processing units or the execution units and second estimation for estimating which of the one or more processing units the processing unit being executed is or to which of the one or more processing units the execution unit being executed corresponds based on an address of an access destination of the memory access, measures respective performances in the processing units or the execution units based on an estimation result of the first estimation, and aggregates respective measurement results of the performances for each of the processing units based on an estimation result of the second estimation.

10 Claims, 9 Drawing Sheets

(56) References Cited

U.S. PATENT DOCUMENTS

| | | | |
|---|---|---|---|
| 10,810,130 B2* | 10/2020 | Tachibana | G06F 12/0895 |
| 2012/0047336 A1* | 2/2012 | Suzuki | G06F 11/3428 |
| | | | 711/154 |
| 2017/0220891 A1* | 8/2017 | Kim | G06K 9/66 |
| 2017/0344881 A1* | 11/2017 | Okuno | G06N 3/04 |

FOREIGN PATENT DOCUMENTS

| | | |
|---|---|---|
| JP | 2010-157118 A | 7/2010 |
| JP | 2016-146174 A | 8/2016 |
| JP | 2017-111642 A | 6/2017 |
| JP | 2017-211799 A | 11/2017 |

\* cited by examiner

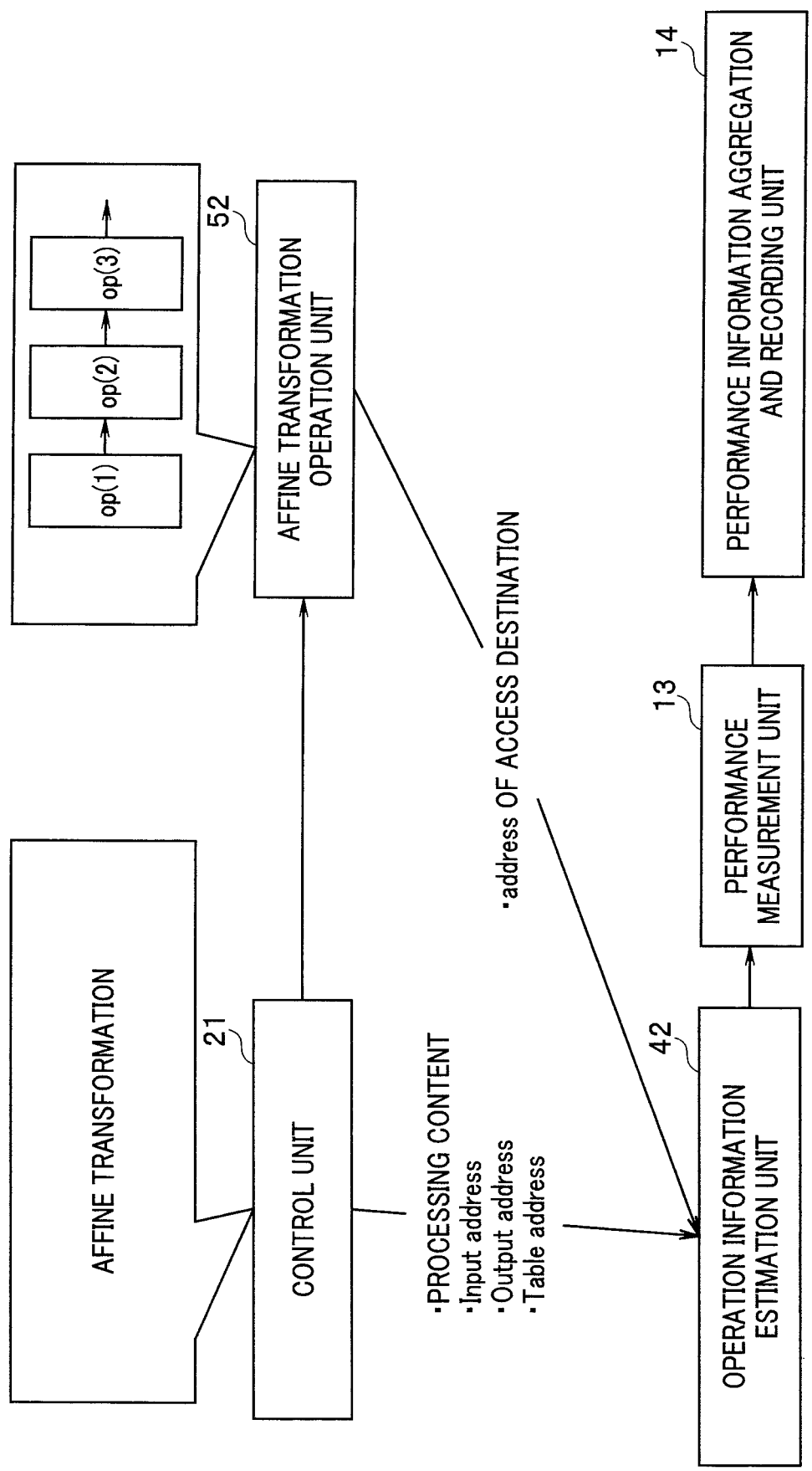

PROCESSOR PERFORMANCE MEASUREMENT APPARATUS AND PROCESSOR PERFORMANCE MEASUREMENT METHOD

CROSS-REFERENCE TO RELATED APPLICATION

This application is based upon and claims the benefit of priority from the prior Japanese Patent Application No. 2020-040547 filed in Japan on Mar. 10, 2020; the entire contents of which are incorporated herein by reference.

FIELD

Embodiments described herein relate generally to a processor performance measurement apparatus and a processor performance measurement method.

BACKGROUND

Conventionally, there has been a technique for implementing recognition and classification, for example, from information such as an image or a voice by a neural network. For example, in a convolutional neural network technique, layers such as a convolutional layer and a fully connected layer are made consecutive to constitute a neural network, and predetermined operations such as a convolutional operation and a fully connecting operation are performed in each of the layers, to implement recognition and classification, for example.

In a processor configured to implement processing by the neural network, the layers differ in a processing time period, a bus width, a latency, and the like depending on a network structure such as a kernel size, a number of channels (a number of parameters), and a type of operation of a neural network. Therefore, the network structure in each of the layers is appropriately designed so that a processing time period in an entire network can be shortened.

To optimize the network structure, a performance for each of the layers needs to be measured. However, a performance measurement for each of the layers is not easy.

BRIEF DESCRIPTION OF THE DRAWINGS

FIG. 9 depicts an explanatory diagram for describing a performance measurement at the time of affine transformation processing.

DETAILED DESCRIPTION

According to one or more embodiments, a processor performance measurement apparatus according to an embodiment includes a processor, in which the processor detects that a memory access occurs, the memory access being required to execute processing units or execute execution units by a processor to be measured, the processor to be measured being configured to implement a predetermined function by one or more processing units and one or more execution units required to execute the processing units, performs first estimation for estimating switching of the processing units or the execution units and second estimation for estimating which of the one or more processing units the processing unit being executed is or to which of the one or more processing units the execution unit being executed corresponds based on an address of an access destination of the memory access, measures respective performances in the processing units or the execution units based on an estimation result of the first estimation, and aggregates respective measurement results of the performances for each of the processing units based on an estimation result of the second estimation.

Embodiment of the present invention will be described in detail below with reference to the drawings.

First Embodiment

Figure 1:
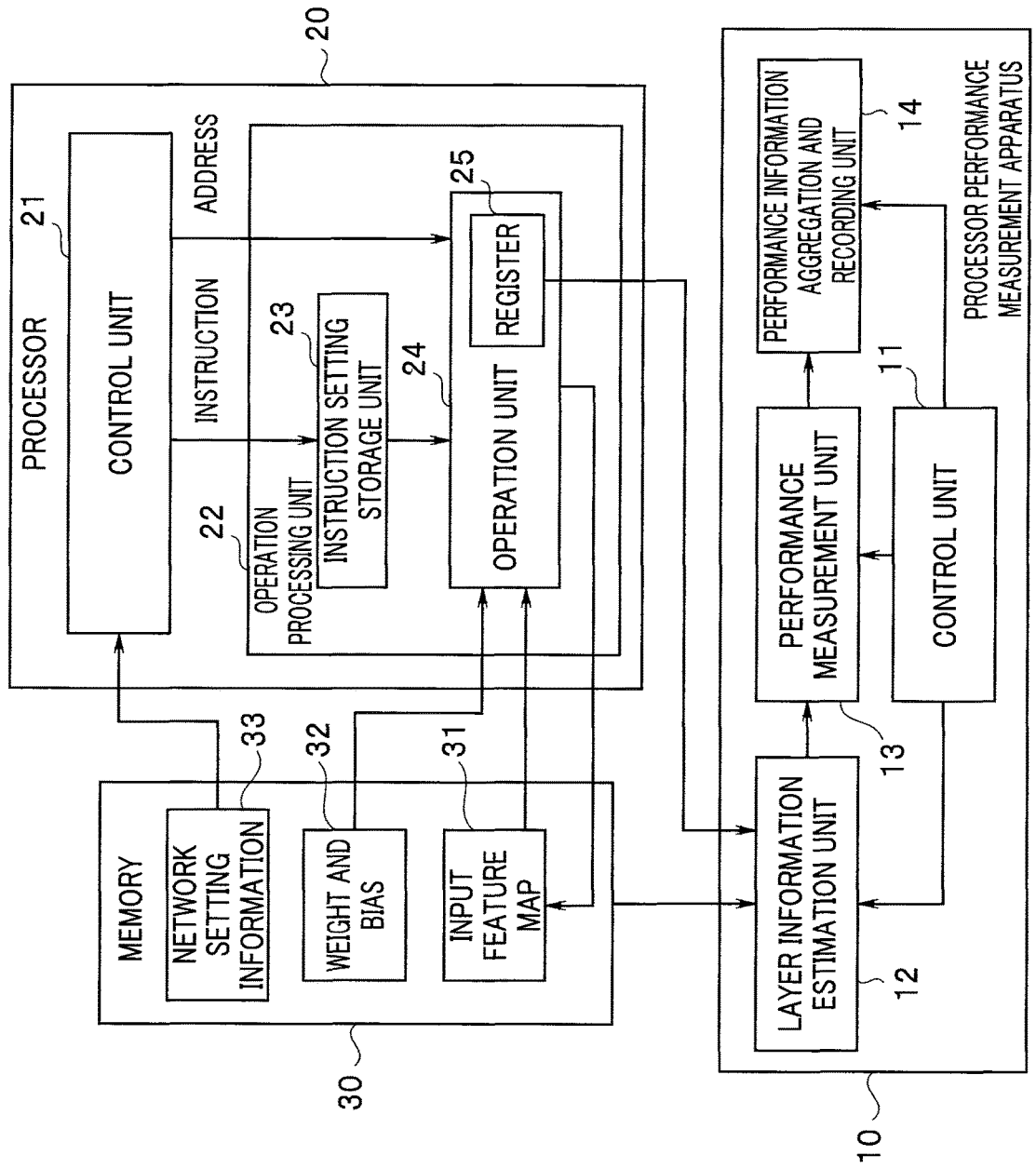
FIG. 1 depicts a block diagram illustrating a processor performance measurement apparatus and a processor to be measured according to a first embodiment.

FIG. 1 is a block diagram illustrating a processor performance measurement apparatus and a processor to be measured according to a first embodiment. The processor a performance of which is to be measured in the present embodiment performs processing for implementing a predetermined function in one or more processing units, and performs a design corresponding to a performance of each of the processing units so that a higher performance can be achieved as a whole. The processing units are respectively modules designed using predetermined settings, and the differently designed modules are respectively the different processing units.

For example, a processor configured to implement a convolutional neural network (hereinafter referred to as a CNN) includes a hardware module configured to perform a convolutional operation and a hardware module configured to perform a pooling operation. Although the modules can be respectively one processing unit, the modules are respectively different processing units if differently set. If processing in a plurality of layers is performed using the one hardware module configured to perform a convolutional operation, for example, the layers are respectively processing units because the layers are differently set. If the processor implements an operation to be performed in each of the layers in the CNN (hereinafter referred to as a CNN operation) using software, a network to be implemented by the software is differently set for each of the layers. Thus, the layers are respectively processing units.

It may be difficult to measure the performance of the processor for each of the predetermined processing units depending on a type of processing to be performed by the processor. For example, for a processor configured to implement the CNN, there is a problem in a measurement of a performance for each of respective layers as predetermined processing units. Examples of the performance include a processing time period required for processing, etc.

An operation unit constituting the processor acquires an instruction to perform a series of operation processing in each of the layers in the CNN from a control unit configured by a CPU and the like and executes an operation according to the instruction. Although a performance such as a processing time period required for the operation unit to perform processing in all the layers can be grasped in the control unit, the control unit cannot grasp the performance for each of the layers.

Note that the operation unit may perform an operation in each of the layers using a plurality of instruction executions (hereinafter referred to as execs). When a code for confirming a processing start timing of each of the layers is embedded into an execution code for the exec, a start of processing in each of the layers, for example, can be confirmed. However, in this case, a code different from an execution code originally required needs to be embedded.

In the CNN, for example, tiling for performing processing by dividing an input image into a plurality of parts in consideration of a relationship between an input image data size and a memory capacity, for example, may be adopted. Processing in the same layer may be distributed by the tiling. Thus, processing time periods using each of the execs as execution units need to be aggregated to find a processing time period in each of the layers. However, the number of execs required to execute each of the layers in the CNN increases by the tiling. If the number of channels of the input image data is 3, and the number of pixels in length by breadth is 224×224, when the CNN is composed of 16 layers, the number of execs reaches into several thousands. Therefore, a memory capacity required to aggregate the processing time periods becomes significantly large, and a many pieces of classification information need to be set to classify each of the execs.

An example of a related apparatus configured to measure a performance of a computer is an apparatus configured to measure a time period for processing by a clock counter when a measurement condition is specified. A performance of each of the layers in the CNN may be conceivably measured by adopting a technique for the apparatus. However, even if the technique for the apparatus is used, it cannot be judged which of the execs is to be executed in the operation unit. Therefore, the performance for each of the layers cannot be measured.

An example of another related technique is an apparatus configured to measure power consumption at the time of executing a function by a processor. In the apparatus, a measurement function for measuring power consumption of the processor is executed for each predetermined time period, and classification information of each of a plurality of functions is stored so that the power consumption of the processor associated with execution for each of the functions is measured. However, if the proposed technique is adopted, it is necessary to add an execution code for the measurement and add classification information for classifying execs.

As another related technique, an apparatus configured to store statistical data of an upper predetermined number of events that greatly affect deterioration in a performance of a processor and have a statistical reliability satisfying a reference has also been proposed. However, even if the proposed technique is adopted, only information about an upper predetermined number of execs that greatly affect a performance is recorded so that a performance for each layer cannot be measured.

Thus, in order to measure a performance for each layer in a processor configured to implement the CNN, there are such problems that a memory having a relatively large capacity is required or a code for measurement, which is unnecessary to an original execution code, needs to be added to the original execution code.

The present embodiment enables, when an exec as an execution unit of an operation in an operation unit constituting a processor is executed, a performance for each of predetermined processing units to be measured by using information such as a processing content and an address of input/output data to classify the exec and judging a predetermined processing unit corresponding to the exec.

FIG. 1 illustrates an example of a case where a processor 20 to be controlled performs the CNN operation. The processor 20 includes a control unit 21 and an operation processing unit 22. The operation processing unit 22 includes an instruction setting storage unit 23 and an operation unit 24. The control unit 21 may be configured by a processor using a CPU (central processing unit), an FPGA (field programmable gate array), or the like, may control each of the units by operating according to a program stored in a memory (not illustrated), or may implement some or all of functions using a hardware electronic circuit.

The operation processing unit 22 may be configured by a hardware accelerator chip dedicated to the CNN, for example, may adopt a programmable accelerator chip a part of which is configured by hardware, or may adopt a CPU, an FPGA, a GPU (graphic processing unit), or the like to perform some or all of CNN operations by a program.

A memory 30 is configured by a predetermined recording medium such as a DRAM, and includes a region 31 storing a feature map, a region 32 storing a weight and a bias, and a region 33 storing network setting information. Note that the regions 31 to 33 may be respectively provided in recording media different from one another.

The region 31 stores image data (a feature map). Input image data to be subjected to the CNN operation is stored as an input feature map in the region 31. Image data processed by the operation processing unit 22 is stored as an output feature map in the region 31. A weight and a bias to be stored in the region 32 are respectively parameters in the CNN operation, and network setting information to be stored in the region 33 is information about a list of layer IDs for respectively classifying layers in the CNN.

The control unit 21 manages an address (input address) of the input feature map (input data) to be stored in the region 31 and a shape (input shape) of the input data. The control unit 21 manages an address (output address) of the output feature map (output data) to be stored in the region 31 and a shape (output shape) of the output data. Similarly, the control unit 21 manages an address (a weight address) of the weight to be stored in the region 32 and a shape (weight shape) of the weight. The control unit 21 controls writing and reading into and from the memory 30.

The control unit 21 controls each of the units in the processor 20, to perform control to execute the CNN operation. The control unit 21 reads out the network setting information from the region 33, generates an instruction required for the CNN operation, and gives the generated instruction to the instruction setting storage unit 23. The operation unit 24 is configured to be able to execute the CNN operation in each of the layers in the CNN, and reads out the instruction from the instruction setting storage unit 23 and executes the CNN operation in each of the layers.

For example, the instruction to be stored in the instruction setting storage unit 23 can be composed of an address and a value of a register 25. The operation unit 24 reads out the instruction from the instruction setting storage unit 23, and sets information corresponding to the instruction in the address of the register 25 specified by the instruction.

For example, the operation unit 24 sets, for each instruction, information such as a type of operation, an input address, an input shape, a weight address, a weight shape, an output address, and an output shape in the register 25 using information from the control unit 21. Note that the type of operation is information indicating the type of operation, e.g., whether the CNN operation is a convolutional operation of a convolutional layer or a pooling operation of a pooling layer.

The operation unit 24 sets an execution in the register 25 according to the instruction, to perform an exec according to a set content, and reads out a subsequent instruction from the instruction setting storage unit 23 when the processing is finished, to repeat similar processing. Thus, a series of CNN operations in each of the layers is performed.

A processor performance measurement apparatus 10 includes a control unit 11 configured to control each of units in the processor performance measurement apparatus 10. The control unit 11 may be configured by a processor using a CPU, an FPGA, or the like, and may control each of the units by operating according to a program stored in a memory (not illustrated) or may implement some or all of functions using a hardware electronic circuit. Each of a layer information estimation unit 12, a performance measurement unit 13, and a performance information aggregation and recording unit 14 within the processor performance measurement apparatus 10 may include a CPU or the like, and may control each of the units by operating according to a program stored in a memory (not illustrated) or may implement some or all of functions using a hardware electronic circuit.

In the present embodiment, the processor performance measurement apparatus 10 includes the layer information estimation unit 12 to measure the performance of the processor 20. The layer information estimation unit 12 acquires the network setting information to be read out of the memory 30 to the control unit 21 at the time of starting to execute the CNN operation. The layer information estimation unit 12 monitors the register 25 at the time of executing the CNN operation, and acquires a register value stored in the register 25. The layer information estimation unit 12 includes a memory (not illustrated) storing the acquired network setting information and register value.

The layer information estimation unit 12 estimates that the exec being currently executed in the operation unit 24 corresponds to which layer of the CNN operation based on the acquired information, to record and output information about the layer ID representing the layer in association with the corresponding exec.

For example, the layer information estimation unit 12 may judge that the layer corresponding to the executed exec has changed from the layer corresponding to the exec executed last time when the type of operation is switched. However, in the CNN operation, the convolutional operation may be repeatedly executed. Even when types of operation respectively acquired in previous and subsequent execs do not change, the layers respectively corresponding to the previous and subsequent execs may change. If tiling is adopted, for example, even operations in the same layer in which the same type of operation is performed may be respectively processed by the different execs.

The layer information estimation unit 12 may estimate the layer corresponding to the executed exec not only by the type of operation but also by a memory access range of the region 31 storing image data and a memory access range of the region 32 storing a weight and a bias.

In the execs for the CNN operation in the same layer, for example, a common weight and a common bias can be considered to be adopted. The layer information estimation unit 12 may judge a weight and a bias used for each of the execs by a weight address and a weight shape, to judge whether or not the two layers respectively corresponding to the two different execs are the same layer.

The layer information estimation unit 12 may judge a region of an image to be read out (hereinafter referred to as an input region) using an input address and an input shape, and judge a region of an image to be written (hereinafter referred to as an output region) using an output address and an output shape.

For example, the layer information estimation unit 12 may judge that the layer corresponding to the exec being executed has not changed from the layer corresponding to the exec executed last time when judging that neither the type of operation nor the weight and the bias (hereinafter also referred to as operation parameters) to be used for the CNN operation have changed.

When the layer information estimation unit 12 judges that the type of operation has changed or the operation parameters have changed for the previous and subsequent execs, if the layer information estimation unit 12 detects an existence of an exec in which operation parameters the same as the operation parameters in the subsequent exec are used and of which processing targets, i.e., input region and output region (hereinafter also referred to as a feature map region) partially overlap or are adjacent to processing targets, i.e., an input region and an output region of the subsequent exec, the subsequent exec may be judged to correspond to the same layer as the layer corresponding to the detected exec. Note that if a feature map in the feature map region can be recognized as an image, the feature map region is also merely referred to as an image region.

The layer information estimation unit 12 outputs a layer ID obtained by estimation to the performance measurement unit 13 by assigning information about a start timing of the exec corresponding to the layer to the layer ID or at a start timing of the exec. In other words, the layer information estimation unit 12 outputs the layer ID corresponding to the exec to the performance measurement unit 13 such that a timing at which the exec starts to be executed can be grasped in the performance measurement unit 13.

The performance measurement unit 13 measures the performance of the processor 20. Examples of the performance to be measured by the performance measurement unit 13 can conceivably include a processing time period, power consumption, and a required bus band. If the performance measurement unit 13 measures the performance, e.g., the processing time period of the processor 20, for example, a timer (not illustrated) measures an execution period of the exec being executed in the processor 20 from an output of the layer information estimation unit 12. If the performance measurement unit 13 measures the performance, e.g., the power consumption of the processor 20, a power measurement device (not illustrated) measures power consumption during an execution period of the exec being executed in the processor 20 from an output of the layer information estimation unit 12. If the performance measurement unit 13 measures a performance for a bus width required by the operation unit 24, a bus bandwidth to be used during an execution period of the exec being executed in the processor 20 is measured based on information from the control unit 21 or the like from an output of the layer information estimation unit 12. The performance measurement unit 13 outputs a measurement result, together with information about the layer ID, to the performance information aggregation and recording unit 14.

The performance information aggregation and recording unit 14 receives measurement results for each of the layer IDs from the performance measurement unit 13, to aggregate the measurement results for each of the layers. The performance information aggregation and recording unit 14 includes a recording medium (not illustrated), and records an aggregation result on the recording medium.

Figure 2:
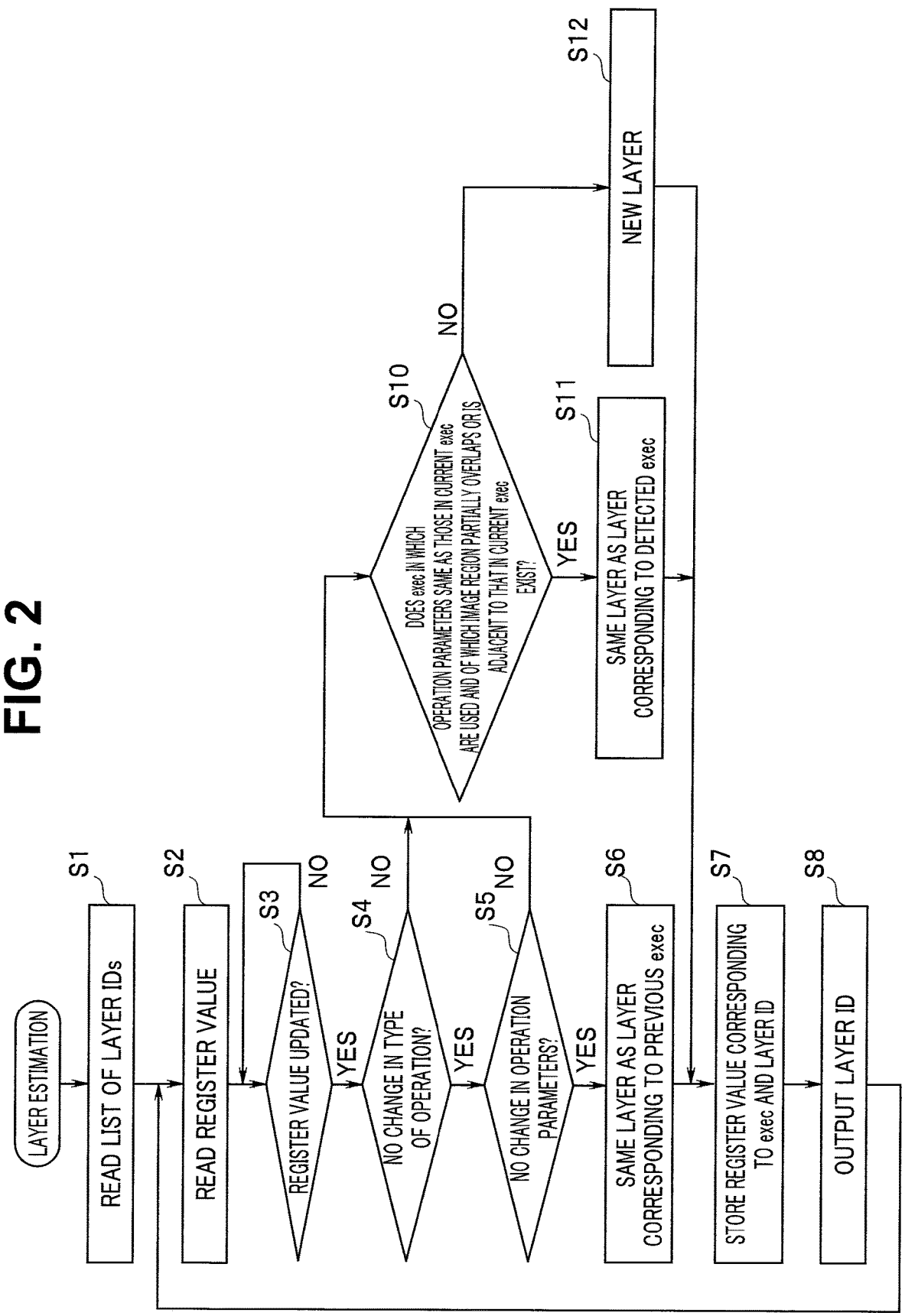
FIG. 2 depicts a flowchart illustrating layer estimation processing.
Figure 3:
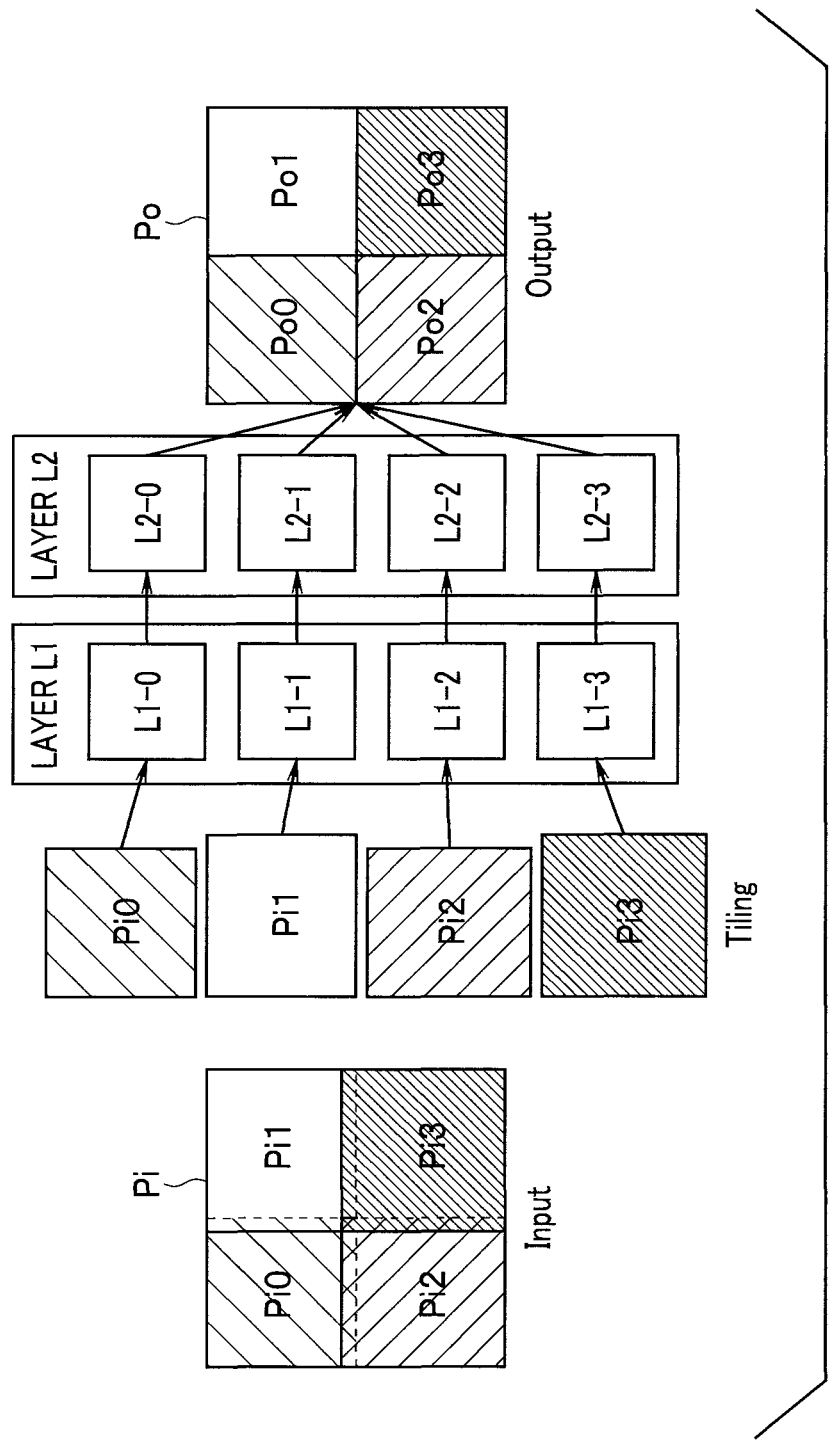
FIG. 3 depicts an explanatory diagram for describing tiling.
Figure 4:
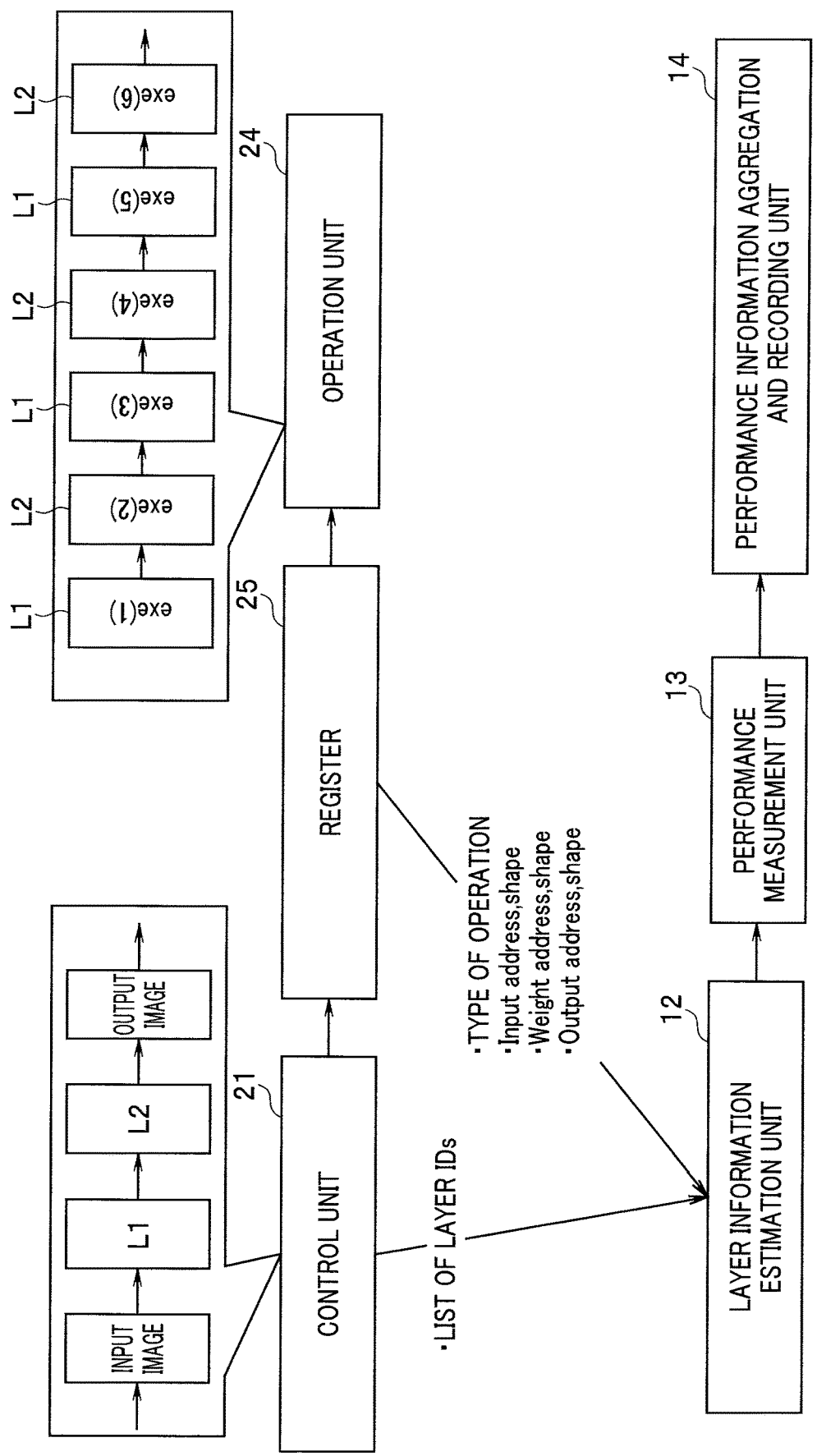
FIG. 4 depicts an explanatory diagram illustrating processing for a CNN operation and a performance measurement in an example illustrated in FIG. 3.
Figure 5:
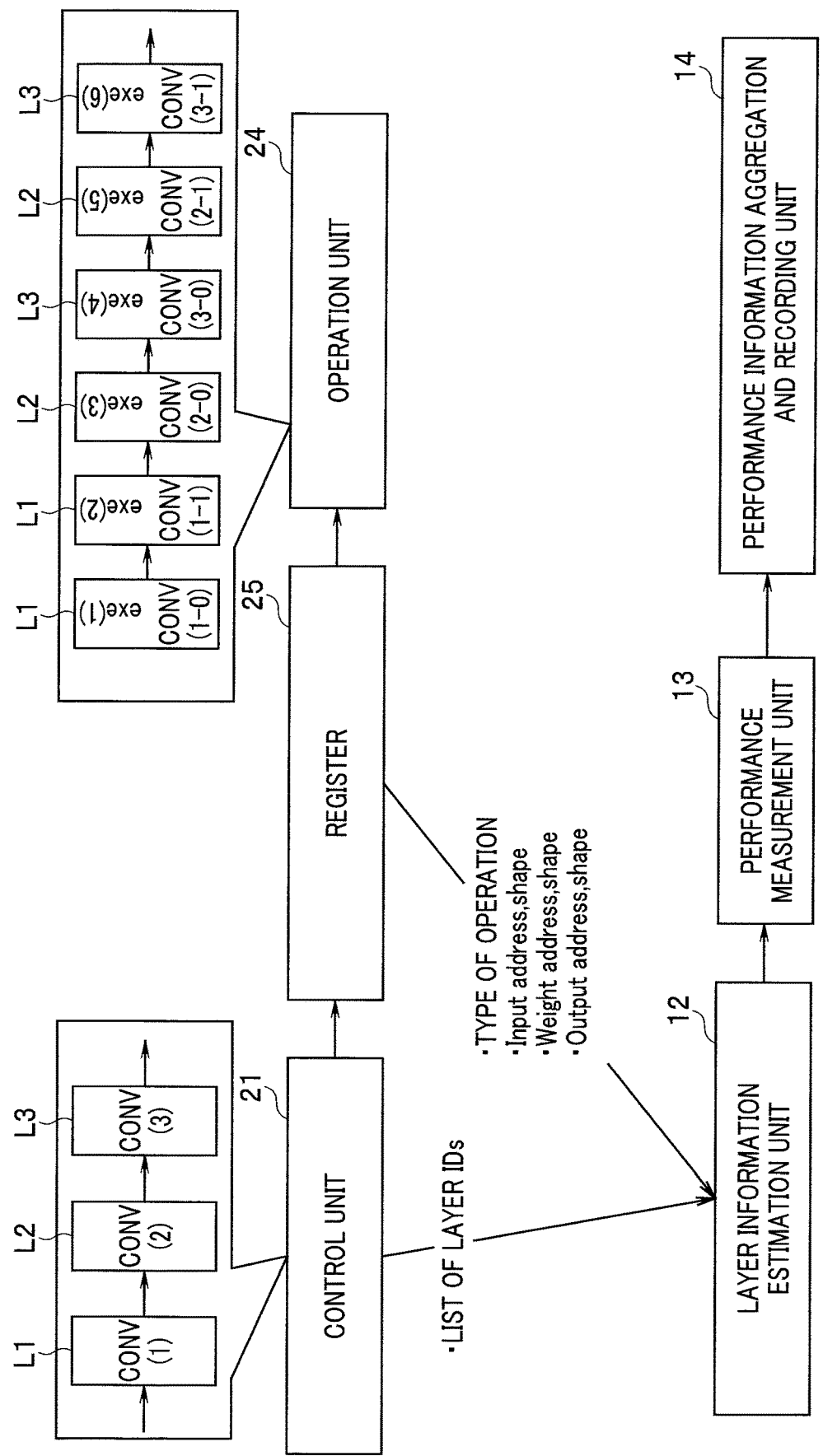
FIG. 5 depicts an explanatory diagram illustrating an example of another processing for a CNN operation.

Then, an operation in the embodiment thus configured will be described with reference to FIGS. 2 to 5. FIG. 2 is a flowchart illustrating layer estimation processing. FIG. 3 is an explanatory diagram for describing tiling. FIG. 4 is an explanatory diagram illustrating processing for the CNN operation and a performance measurement in an example illustrated in FIG. 3. FIG. 5 is an explanatory diagram illustrating an example of another processing for the CNN operation.

The control unit 21 in the processor 20 a performance of which is to be measured reads out network setting information from the memory 30 at the time of starting the CNN operation. In step S1 illustrated in FIG. 2, the layer information estimation unit 12 in the processor performance measurement apparatus 10 collects network setting information at the time of starting the CNN operation. Note that the network setting information includes information about a list of layer IDs. The control unit 21 generates an instruction required for the CNN operation and gives the generated instruction to the instruction setting storage unit 23 according to the network setting information.

Tiling is adopted in the CNN operation. In the example illustrated in FIG. 3, an input image P1 is divided into four parts, and the CNN operation in each of layers is performed for input images Pi0, Pi1, Pi2, and Pi3 obtained by the division. Note that the input images Pi0 to Pi3 differ in image size to ensure image data required for a convolutional operation. The example illustrated in FIG. 3 indicates that processing in a layer L1 and processing in a layer L2 are consecutively performed for each of the images.

In other words, in the example illustrated in FIG. 3, an operation L2-0 in the layer L2 is performed for an operation result of an operation L1-0 in the layer L1 for the image Pi0, to obtain an output Po0 as an operation result of the layer L2. Then, operations L1-1 and L2-1 are respectively performed in the layers L1 and L2 for the image Pi1, to obtain an operation result Po1. Then, operations L1-2 and L2-2 are respectively performed in the layers L1 and L2 for the image Pi2, to obtain an operation result Po2. Finally, operations L1-3 and L2-3 are respectively performed in the layers L1 and L2 for the image Pi3, to obtain an operation result Po3. An operation result Po is obtained by the operation results Po0 to Po3.

The control unit 21 generates such an instruction to enable the CNN operation and gives the generated instruction to the instruction setting storage unit 23, based on the network setting information. The operation unit 24 reads out the instruction from the instruction setting storage unit 23, and sets information corresponding to the instruction to execute the CNN operation in each of the layers in the register 25. Note that pieces of information such as a type of operation, an input address, an input shape, a weight address, a weight shape, an output address, and an output shape are set in the register 25. When an execution is set in the register 25, the operation unit 24 executes the CNN operation while referring to a value set in the register 25.

FIG. 4 illustrates such processing. The control unit 21 generates an instruction for a series of CNN operations for obtaining an output image by adding processing in the layer L1 and processing in the layer L2 to an input image, based on network setting information. Information corresponding to the instruction is stored in the register 25, the operation unit 24 sequentially executes execs depending on the information in the register 25. Note that in FIG. 4, the execs are illustrated in the execution order, with reference numerals in parentheses representing an execution order. FIG. 4 corresponds to the example illustrated in FIG. 3, where exec (1), exec (2), . . . respectively correspond to the layers L1, L2, L1, L2, . . . .

The operation unit 24 reads out image data of the image Pi0 illustrated in FIG. 3, to perform the operation L1-0 in the first exec (1). The layer information estimation unit 12 in the processor performance measurement apparatus 10 monitors the register 25 in the processor 20, and when the information is set in the register 25, reads out information such as a type of operation, an input address, an input shape, a weight address, a weight shape, an output address, and an output shape from the register 25 (step S2). The layer information estimation unit 12 judges whether or not the register value is updated in step S3, and performs processing in step S4 and subsequent steps every time new information is stored in the register 25. Note that although illustration is omitted in FIG. 2, processing proceeds to step S7 from step S3 at the time of executing the first exec (1). In step S7, the layer information estimation unit 12 stores the layer ID of the first layer L1 as an estimation result and stores a register value corresponding to the exec (1) based on information about the list of layer IDs.

The layer information estimation unit 12 outputs the layer ID as an estimation result to the performance measurement unit 13 (step S8). The performance measurement unit 13 measures a performance in a period during which the current exec is being executed. If a processing time period as the performance is measured, for example, the performance measurement unit 13 measures an execution time period of the current exec using an output of a timer. Note that the performance measurement unit 13 may measure not only one performance but also a plurality of types of performances in a period during which each of the execs is being executed. The layer information estimation unit 12 outputs a measurement result, together with information about the layer ID, to the performance information aggregation and recording unit 14 after the measurement for each of the execs is finished.

The operation unit 24 reads out, when the execution of the exec (1) corresponding to the first operation L1-0 is finished, a subsequent instruction from the instruction setting storage unit 23, and sets information corresponding to the instruction in the register 25. The operation unit 24 executes the CNN operation while referring to a value set in the register 25 when an execution is set in the register 25. In other words, the operation unit 24 performs the operation L2-0 in the layer L2 for an operation result in the layer L1 in the second exec (2).

The layer information estimation unit 12 in the processor performance measurement apparatus 10 reads out the register value in step S2, and the processing proceeds from step S3 to step S4. The layer information estimation unit 12 judges, in step S4, whether or not the type of operation has changed based on the information about the type of operation, and judges, in step S5, whether or not operation parameters have changed based on the respective information about a weight address and a weight shape.

In this case, the exec (2) is an operation in the layer L2, and at least the respective information about the weight address and the weight shape have changed. The layer information estimation unit 12 judges that the operation parameters have changed in step S5, and the processing proceeds to step S10. Note that in this case, the type of operation may have changed in step S4. In either case, the processing in step S10 is performed.

In step S10, the layer information estimation unit 12 judges whether or not there exists, until the last time, an exec in which the operation parameters the same as the operation parameters in the current exec are used and of which feature map region (image region as a processing target) partially overlaps or is adjacent to a feature map region (image region as a processing target) of the current exec. In this case, the operation parameters have changed from the operation parameters in the previous exec (1). Thus, the processing proceeds to step S12. In step S12, the layer information estimation unit 12 judges that the exec (2) corresponds to a new layer. The layer information estimation unit 12 estimates that the layer corresponding to the exec (2) is the layer L2 from the list of layer IDs, and stores the layer ID as an estimation result and a register value corresponding to the exec (2).

The layer information estimation unit 12 outputs the layer ID as an estimation result to the performance measurement unit 13 (step S8). The performance measurement unit 13 switches a measurement for the previous exec to a measurement for the current exec in response to an output of the layer information estimation unit 12, and outputs a measurement result for the previous exec, together with the layer ID, to the performance information aggregation and recording unit 14. The performance information aggregation and recording unit 14 aggregates measurement results by the performance measurement unit 13 for each of the layer IDs, and records a performance measurement result for each of the layers on a recording medium.

Then, the performance measurement unit 13 and the performance information aggregation and recording unit 14 similarly operate. Every time the exec to be executed is switched, performances in a period during which the exec is being executed are measured, and the performances are aggregated and recorded for each of the layers.

When the execution of the exec (2) corresponding to the operation L2-0 is finished, the operation unit 24 reads out a subsequent instruction from the instruction setting storage unit 23, and sets information corresponding to the instruction in the register 25. When the execution is set in the register 25, the operation unit 24 executes the CNN operation while referring to a value set in the register 25. In other words, the operation unit 24 performs the operation L1-1 in the layer L1 for the input image Pi1 in the third exec (3).

The layer information estimation unit 12 in the processor performance measurement apparatus 10 reads out the register value in step S2, and in steps S4 and S5, judges whether or not the type of operation has changed and whether or not the operation parameters have changed, respectively. In this case, the exec (3) is an operation in the layer L1, and at least the respective pieces of information about a weight address and a weight shape have changed from the information at the time of executing the previous exec (2). In step S5, the layer information estimation unit 12 judges that the operation parameters have changed, and the processing proceeds to step S10.

In step S10, the layer information estimation unit 12 judges whether or not there exists, until the last time, an exec in which the operation parameters the same as the operation parameters in the current exec are used and of which image region partially overlaps or is adjacent to the image region of the current exec. In this case, the operation parameters are the same as the operation parameters in the exec (1), and an image region of the image Pi1 partially overlaps or is adjacent to an image region of the image Pi0. Thus, the layer information estimation unit 12 collates stored information and detects the exec (1) in step S7. In step S11, the layer information estimation unit 12 estimates that a layer corresponding to the exec (3) is the same layer as the layer corresponding to the exec (1). The layer information estimation unit 12 stores the layer ID as an estimation result and a register value corresponding to the exec (3), and outputs the layer ID to the performance measurement unit 13.

When the execution of the exec (3) corresponding to the operation L1-1 is finished, the operation unit 24 reads out a subsequent instruction from the instruction setting storage unit 23, and sets information corresponding to the instruction in the register 25. When the execution is set in the register 25, the operation unit 24 performs the operation L2-1 in the layer L2 for an operation result in the layer L1 in the fourth exec (4).

The layer information estimation unit 12 in the processor performance measurement apparatus 10 reads out the register value in step S2, and in steps S4 and S5, judges whether or not the type of operation has changed and whether or not the operation parameters have changed, respectively. In this case, the layer information estimation unit 12 judges that the operation parameters have changed in step S5, and the processing proceeds to step S10. In step S10, the layer information estimation unit 12 judges whether or not there exists, until the last time, an exec in which the operation parameters the same as the operation parameters in the current exec are used and of which image region partially overlaps or is adjacent to the image region of the current exec. In this case, the operation parameters are the same as the operation parameters in the exec (2), and an image region of the image Pi0 partially overlaps or is adjacent to the image region of the Pi1. Thus, in step S7, the layer information estimation unit 12 detects the exec (2) based on the information stored. In step S11, the layer information estimation unit 12 estimates that a layer corresponding to the exec (4) is the same layer as the layer corresponding to the exec (2). The layer information estimation unit 12 stores the layer ID as an estimation result and a register value corresponding to the exec (4), and outputs the layer ID to the performance measurement unit 13.

Then, a similar operation is performed. The layer information estimation unit 12 estimates the layer corresponding to each of the execs to be sequentially executed, the performance measurement unit 13 measures a performance for each of the execs, and the performance information aggregation and recording unit 14 aggregates and records respective measurement results of the performances for each of the layer IDs. Thus, at the time point where all the execs are finished, the aggregation result of the performances for each of the layers is recorded in the performance information aggregation and recording unit 14.

Then, another example of the CNN operation will be described with reference to FIG. 5. FIG. 5 illustrates an example of a case where the operations in all layers L1, L2, and L3 are each a convolutional operation (CONV), and the operation in each of the layers is executed by an exec corresponding to the convolutional operation. In the example illustrated in FIG. 5, the convolutional operation in the layer L1 is divided into an operation CONV (1-0) and an operation CONV (1-1), and the operations are respectively performed by an exec (1) and an exec (2). The convolutional operation in the layer L2 is divided into an operation CONV (2-0) and an operation CONV (2-1), and the operations are respectively performed by an exec (3) and an exec (5). The convolutional operation in the layer L3 is divided into an operation CONV (3-0) and an operation CONV (3-1), and the operations are respectively performed by an exec (4) and an exec (6). In the layers L2 and L3, the operation CONV (2-0), the operation CONV (3-0), the operation CONV (2-1), and the operation CONV (3-1) are performed in this order.

In the example illustrated in FIG. 5, estimation processing of a layer ID, a performance measurement for each of the execs, and aggregation and recording processing of respective measurement results of performances for each layer ID are also performed, like in the foregoing description. Thus, only the estimation processing of the layer ID will be described. The estimation processing of the layer ID follows the flow illustrated in FIG. 2.

When the exec (1) is executed, the layer information estimation unit 12 judges that the layer corresponding to the first exec (1) is the layer L1 from the list of layer IDs. In the next second exec (2), the layer information estimation unit 12 judges that the type of operation has not changed and the operation parameters have not changed (steps S4 and S5), and estimates that the layer corresponding to the exec (2) is the layer L1 in step S6.

Then, the operation unit 24 executes the operation CONV (2-0) in the third exec (3). The layer information estimation unit 12 judges that the type of operation has not changed, but the operation parameters have changed (step S5), and the processing proceeds to step S12 after the judgment in step S10. In step S12, the layer information estimation unit 12 estimates that the layer corresponding to the exec (3) is the layer L2.

Then, the operation unit 24 executes the operation CONV (3-0) in the exec (4). The layer information estimation unit 12 judges that the type of operation has not changed, but the operation parameters have changed (step S5), and the processing proceeds to step S12 after the judgment in step S10. In step S12, the layer information estimation unit 12 estimates that the layer corresponding to the exec (4) is the layer L3.

Then, the operation unit 24 executes the operation CONV (2-1) in the exec (5). The layer information estimation unit 12 judges that the type of operation has not changed, but the operation parameters have changed (step S5), and the processing proceeds to step S10. In step S10, the layer information estimation unit 12 judges whether or not there exists, until the last time, an exec in which the operation parameters the same as the operation parameters in the current exec are used and of which image region partially overlaps or is adjacent to the image region of the current exec. In this case, the operation parameters are the same as the operation parameters in the exec (3), and an image region of an input image or an output image of the exec (5) partially overlaps or is adjacent to an image region of an input image or an output image of the exec (3). Thus, the layer information estimation unit 12 detects the exec (3) based on the stored information. In step S11, the layer information estimation unit 12 estimates that a layer corresponding to the exec (5) is the same layer L2 as the layer corresponding to the exec (3).

Then, the operation unit 24 executes the operation CONV (3-1) in the exec (6). The layer information estimation unit 12 judges that the type of operation has not changed, but the operation parameters have changed (step S5), and the processing proceeds to step S10. In step S10, the layer information estimation unit 12 judges whether or not there exists, until the last time, an exec in which the operation parameters the same as the operation parameters in the current exec are used and of which image region partially overlaps or is adjacent to the image region of the current exec. In this case, the operation parameters are the same as the operation parameters in the exec (4), and an image region of an input image or an output image of the exec (6) partially overlaps or is adjacent to an image region of an input image or an output image of the exec (4). Thus, the layer information estimation unit 12 detects the exec (4) based on the stored information. In step S11, the layer information estimation unit 12 estimates that a layer corresponding to the exec (6) is the same layer L3 as the layer corresponding to the exec (4).

Other actions are similar to the actions described above.

In the present embodiment, in an instruction execution by the operation unit constituting the processor, the instruction execution as an execution unit is classified by using information such as a processing content and an address of input/output data, and a predetermined processing unit corresponding to the instruction execution is judged, to enable a performance for each predetermined processing unit to be measured. If the present embodiment is applied to a processor configured to perform a CNN operation, for example, when information such as a type of operation, an input address, an input shape, a weight address, a weight shape, an output address, and an output shape used in an instruction to perform a CNN operation are acquired, it can be judged to which of layers each of the instruction executions corresponds, and a performance for each of the layers can be measured. To measure the performance for each of the layers, a code for measurement need not be embedded for each of the instruction executions, and classification information for classifying the instruction execution need not be added. Further, a value obtained by a performance measurement may be recorded not in unit of instruction executions but for each of the layers. Thus, the performance for each of the layers can be measured without a required memory capacity being increased.

Second Embodiment

Figure 6:
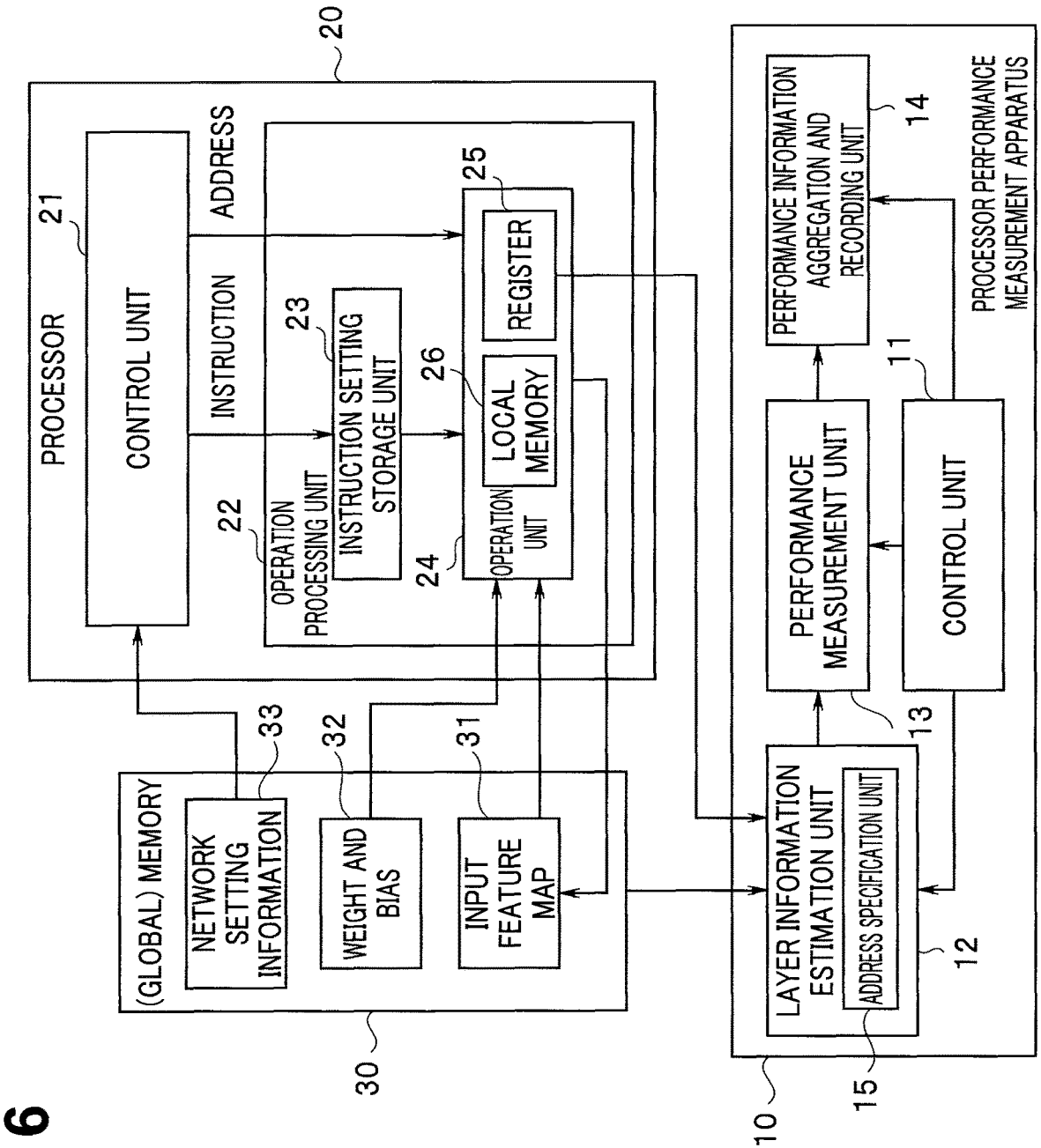
FIG. 6 depicts a block diagram illustrating a second embodiment.

FIG. 6 is a block diagram illustrating a second embodiment. The same components as the components illustrated in FIG. 1 are assigned with the same reference numerals, and description of the components is omitted in FIG. 6.

The present embodiment differs from the first embodiment in that an operation unit 24 including a local memory 26 is adopted in a processor 20 and a layer information estimation unit 12 in a processor performance measurement apparatus 10 includes an address specification unit 15.

In a CNN operation, a control unit 21 in the processor 20 generates an instruction to cause the operation unit 24 to execute the CNN operation while causing the local memory 26 in the operation unit 24 to store some of data stored in a memory (hereinafter also referred to as a global memory) 30. The operation unit 24 sets information in a register 25 based on an instruction stored in an instruction setting storage unit 23. The information to be set in the register 25 includes a load and store instruction to load and store data from the local memory 26 and respective information about an address and a shape of the instruction. For example, the register 25 includes an address of the global memory 30 (a global address) and an address of the local memory 26 (a local address).

When the load and store instruction is set in the register 25, the operation unit 24 specifies the global address in the global memory 30 and reads out data, and specifies the local address in the local memory 26 and stores data. Then, the operation unit 24 performs the CNN operation using the data stored in the local memory 26.

The layer information estimation unit 12 reads out a register value stored in the register 25, and estimates a layer corresponding to an exec being currently executed. In this case, the layer information estimation unit 12 reads out both the global address and the local address from the register 25. The address specification unit 15 in the layer information estimation unit 12 transforms the local address used for processing by the operation unit 24 into the global address to estimate a layer ID. The layer information estimation unit 12 estimates the layer using the global address, like in the first embodiment.

Figure 7:
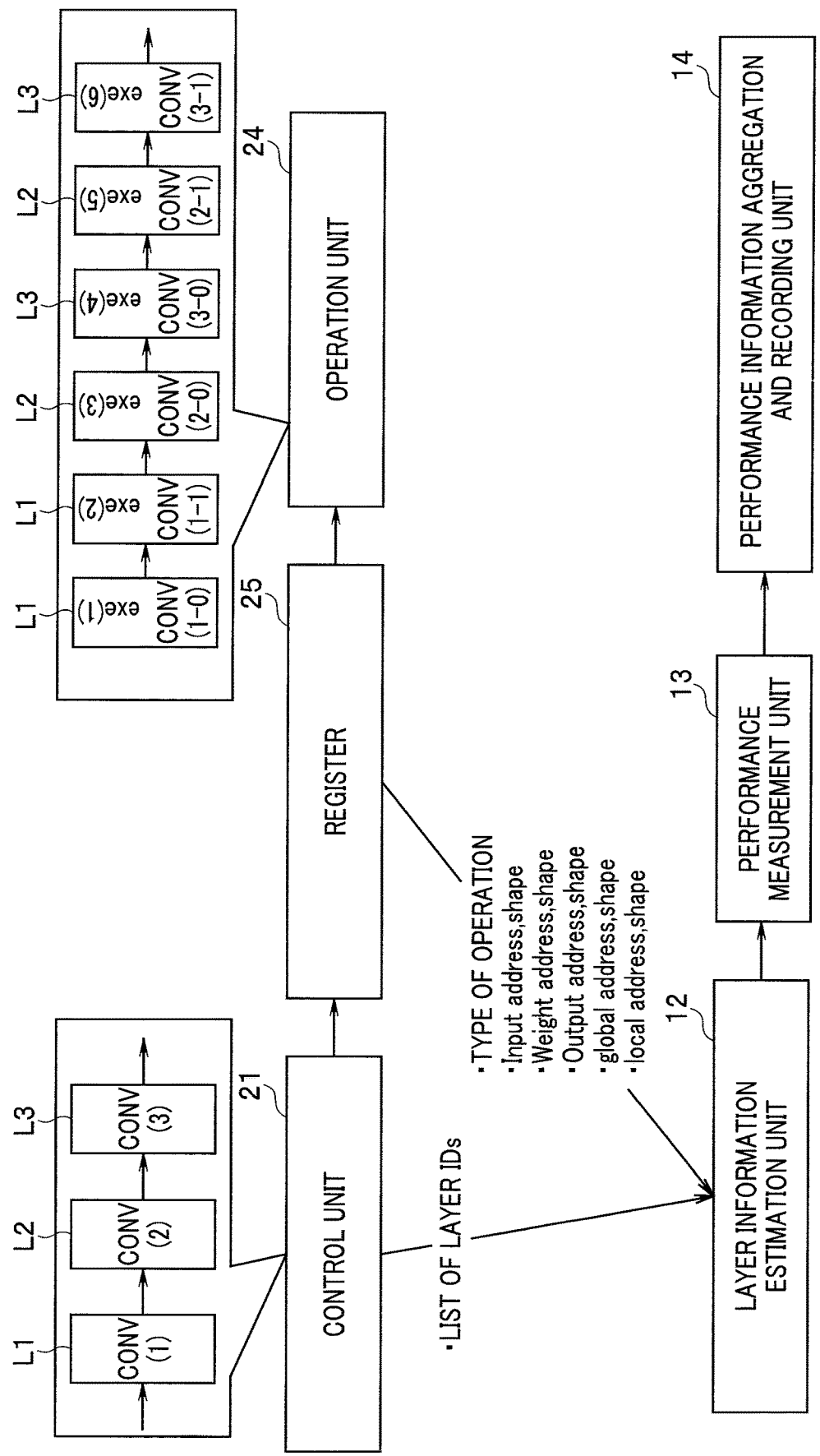
FIG. 7 depicts an explanatory diagram illustrating an example of a CNN operation in the second embodiment.

Then, an operation in the embodiment thus configured will be described with reference to an explanatory diagram of FIG. 7. FIG. 7 illustrates an example of a CNN operation similar to that illustrated in FIG. 5.

In the present embodiment, a performance measurement by a performance measurement unit 13 and aggregation and recording by a performance information aggregation and recording unit 14 are also similar to the performance measurement and the aggregation and recording in the first embodiment. The present embodiment only differs from the first embodiment in that when the layer information estimation unit 12 estimates the layer, the estimation is performed using the global address instead of the local address used for the CNN operation by the operation unit 24. Except this, the present embodiment adopts a similar flow to the flow illustrated in FIG. 2.

The layer information estimation unit 12 reads out the register value and stores the read register value in a memory (not illustrated) in step S2 illustrated in FIG. 2. In this case, the global address and the local address read by a load command are also read. The address specification unit 15 transforms the local address into the global address using the global address and the local address. The layer information estimation unit 12 uses the global address in judgments in steps S4, S5, and S10 illustrated in FIG. 2.

At the time of executing an exec (1), the layer information estimation unit 12 estimates that a layer corresponding to the exec (1) is a layer L1.

At the time of executing an exec (2), the layer information estimation unit 12 judges that the exec (2) corresponds to the same layer as the layer at the time of executing the exec (1) because a type of operation has not changed, a global address of a weight address has not changed, and operation parameters have not changed. Further, in this case, a global address specifying an input region or an output region partially overlaps or is adjacent to the global address at the time of executing the exec (1). Therefore, the layer information estimation unit 12 estimates that the layer corresponding to the exec (2) is the same layer L1 as the layer corresponding to the exec (1).

At the time of executing an exec (3), the layer information estimation unit 12 judges that a global address of a weight address has changed and operation parameters have changed. In this case, the layer information estimation unit 12 judges that there is no exec in which the operation parameters the same as the operation parameters in the exec (3) are used and of which feature map region (image region as the processing target) partially overlaps or is adjacent to the feature map region (image region as the processing target) of the exec (3), based on the global address specifying the input region or the output region. As a result, the layer information estimation unit 12 estimates that a new layer L3 is a layer corresponding to the exec (3).

At the time of executing an exec (4), the layer information estimation unit 12 judges that operation parameters have changed using a global address. In this case, the layer information estimation unit 12 also judges, by the comparison of the global addresses, that there is no exec in which the operation parameters the same as the operation parameters in the exec (4) are used and of which image region partially overlaps or is adjacent to the image region in the exec (4). As a result, the layer information estimation unit 12 estimates that a new layer L4 is a layer corresponding to the exec (4).

At the time of executing an exec (5), the layer information estimation unit 12 judges that operation parameters have changed by a change in a global address. In this case, the layer information estimation unit 12 detects, by the comparison of the global addresses, that an exec in which the operation parameters the same as the operation parameters in the exec (5) are used and of which image region partially overlaps or is adjacent to the image region of the exec (5) is the exec (3). As a result, the layer information estimation unit 12 estimates that a layer corresponding to the exec (5) is the layer L2 corresponding to the exec (3).

At the time of executing an exec (6), the layer information estimation unit 12 judges that operation parameters have changed by a change in a global address. In this case, the layer information estimation unit 12 detects, by the comparison of the global addresses, that an exec in which the same operation parameters as the operation parameters in the exec (6) are used and of which image region partially overlaps or is adjacent to the image region in the exec (6) is the exec (4). As a result, the layer information estimation unit 12 estimates that a layer corresponding to the exec (6) is the layer L3 corresponding to the exec (4).

Thus, the layer corresponding to each of the execs illustrated in FIG. 7 can be estimated. The second embodiment is similar to the first embodiment in that performances are measured for each of the execs and the measured performances of the execs are aggregated and recorded for each layer ID.

In the present embodiment, an effect similar to that in the first embodiment can also be obtained. In the present embodiment, even when the address of the local memory is used in the operation in the processor, the local address is transformed into the global address so that it can be grasped to which of layers each of the execs corresponds.

Third Embodiment

Figure 8:
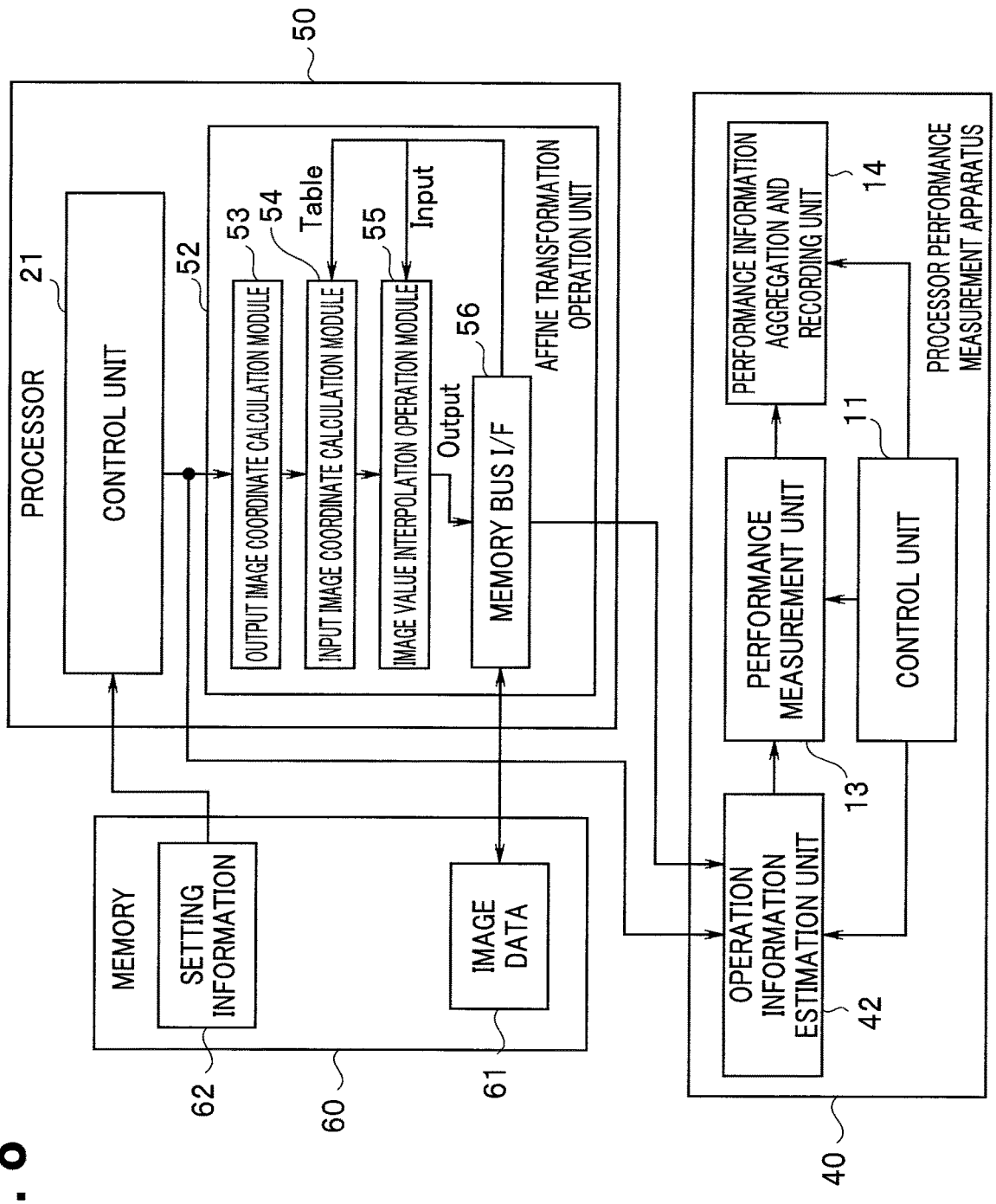
FIG. 8 depicts a block diagram illustrating a third embodiment.

FIG. 8 is a block diagram illustrating a third embodiment. The same components as the components illustrated in FIG. 1 are assigned with the same reference numerals, and description of the components is omitted in FIG. 8. The present embodiment is applied to a performance measurement of a processor having a function for performing an operation other than a CNN operation. An example illustrated in FIG. 8 is an example applied to a processor configured to perform affine transformation as a predetermined function.

A processor 50 to be controlled includes an affine transformation operation unit 52. The affine transformation operation unit 52 may be configured by a hardware accelerator chip dedicated to affine transformation, for example, may adopt a programmable accelerator chip a part of which is configured by hardware, and may adopt a CPU, an FPGA, a GPU (graphic processing unit), or the like to perform some or all of affine transformation operations by a program.

A memory 60 is configured by a predetermined recording medium such as a DRAM, and includes a region 61 storing image data and a region 62 storing affine transformation setting information. The region 62 also stores a transformation table for specifying affine transformation. Note that the regions 61 and 62 may be respectively provided in different recording media.

A control unit 21 manages an address of image data to be stored in the region 61, i.e., an input address of input image data to be read by the affine transformation operation unit 52 and an output address of output image data to be outputted by the affine transformation operation unit 52. Similarly, the control unit 21 manages an address of a transformation table (a table address) to be stored in the region 61. The control unit 21 controls writing and reading into and from the memory 60.

The control unit 21 generates an instruction to perform affine transformation based on the setting information read out of the region 62. The instruction includes a processing content of affine transformation, an input address, an output address, and a table address. The control unit 21 outputs the generated instruction to an output image coordinate calculation module 53 in the affine transformation operation unit 52.

The affine transformation operation unit 52 includes the output image coordinate calculation module 53, an input image coordinate calculation module 54, an image value interpolation operation module 55, and a memory bus I/F 56. The output image coordinate calculation module 53 calculates coordinates of a predetermined range of an output image and outputs a calculation result to the input image coordinate calculation module 54 according to the instruction from the control unit 21.

The input image coordinate calculation module 54 is given the table address from the control unit 21, and accesses the memory 60 by giving the table address to the memory bus I/F 56 and reads out the transformation table. The input image coordinate calculation module 54 refers to the transformation table, to calculate input image coordinates corresponding to output image coordinates and output the calculated input image coordinates to the image value interpolation operation module 55.

The image value interpolation operation module 55 is given the input address and the output address from the control unit 21. The image value interpolation operation module 55 accesses the memory 60 by giving the input address to the memory bus I/F 56, and reads out the image data. The image value interpolation operation module 55 subjects an input image to affine transformation based on the input image coordinates from the input image coordinate calculation module 54. A pixel position of the image after the transformation is not generally an integer pixel position. The input image coordinate calculation module 54 performs linear interpolation using a pixel value of the integer pixel position for the image after the transformation, to obtain transformed image data. Note that the image value interpolation operation module 55 may adopt Lanczos and spline interpolations, for example, in addition to the linear interpolation. The image value interpolation operation module 55 accesses the memory 60 by giving the output address to the memory bus I/F 56, and writes the transformed image data as output image data to the region 61 in the memory 60.

In the example illustrated in FIG. 8, in response to the instruction, from the control unit 21, for instructing an affine transformation, the processing is performed by the processing being divided into at least three operations, i.e., an operation by the output image coordinate calculation module 53, an operation by the input image coordinate calculation module 54, and an operation by the image value interpolation operation module 55. However, in the control unit 21, a performance of the entire affine transformation can also be measured, but a performance of each of the operations cannot be determined.

In the present embodiment, the operations are respectively assumed as predetermined processing units, and the processor performance measurement apparatus 40 measures the performance of each of the operations using a method similar to the method in each of the above-described embodiments.

The processor performance measurement apparatus 40 differs from the processor performance measurement apparatus 10 illustrated in FIG. 1 in that an operation information estimation unit 42 is adopted instead of the layer information estimation unit 12. The operation information estimation unit 42 acquires respective pieces of information about a processing content, an input address, an output address, and a table address included in the instruction from the control unit 21 at the time of starting the affine transformation, and stores the acquired information in a memory (not illustrated). The operation information estimation unit 42 acquires information about an address specified at the time of a memory access to the memory 60 from the memory bus I/F 56.

The operation information estimation unit 42 estimates a current operation based on the respective stored information about a processing content, an input address, an output address, and a table address and the information about the address to be generated from the memory bus I/F 56 at the time of an affine operation. The operation information estimation unit 42 stores an estimation result in association with the information used for the estimation, and outputs an estimation result, together with an ID assigned to an operation (hereinafter referred to as an operation ID), to a performance measurement unit 13. In this case, the operation information estimation unit 42 outputs the estimation result such that an execution period of each of operations can be grasped, like in each of the above-described embodiments.

The performance measurement unit 13 measures performances in the execution period of the operation, and outputs measurement results, together with the operation IDs, to a performance information aggregation and recording unit 14. The performance information aggregation and recording unit 14 aggregates and records the measurement results from the performance measurement unit 13 for each of the operations.

Then, the embodiment thus configured will be described with reference to FIG. 9. FIG. 9 is an explanatory diagram for describing a performance measurement at the time of affine transformation processing.

The control unit 21 in the processor 50 reads out setting information about affine transformation from the memory 60, to generate an instruction. The control unit 21 gives the generated instruction to the affine transformation operation unit 52. The operation information estimation unit 42 in the processor performance measurement apparatus 40 acquires respective pieces of information about a processing content, an input address, an output address, and a table address included in the instruction generated by the control unit 21, and stores the acquired information in a memory. Then, the affine transformation operation unit 52 performs affine transformation processing according to the instruction.

FIG. 9 illustrates such processing. The affine transformation operation unit 52 sequentially executes operations (op (1), op (2), and op (3)) according to the instruction from the control unit 21. The operation information estimation unit 42 acquires the information included in the instruction, and acquires an address of a memory access by the affine transformation operation unit 52, to measure a performance of each of the operations.

In other words, the operation information estimation unit 42 judges that the first operation (hereinafter referred to as the op (1)) has been started in the affine transformation operation unit 52 when the instruction is fed to the affine transformation operation unit 52, and outputs the operation ID of the op (1) to the performance measurement unit 13. As a result, the performance measurement unit 13 starts a performance measurement for the op (1).

The output image coordinate calculation module 53 calculates output image coordinates when receiving the instruction from the control unit 21, and outputs a calculation result to the input image coordinate calculation module 54. The input image coordinate calculation module 54 specifies the table address in the memory bus I/F 56, to access the memory 60. The memory bus I/F 56 reads out a transformation table from an address specified by a table address in the memory 60, and gives the read transformation table to the input image coordinate calculation module 54.

The operation information estimation unit 42 monitors an access by the memory bus I/F 56, and acquires the table address when the memory bus I/F 56 has accessed the memory 60. The operation information estimation unit 42 judges that the second operation (op (2)) by the input image coordinate calculation module 54 has currently been started by comparison with the address stored in the memory, and outputs the operation ID representing the operation to the performance measurement unit 13. As a result, the performance measurement unit 13 switches a performance measurement for the op (1) into a performance measurement for the op (2). The performance measurement unit 13 outputs the performance measurement result for the op (1), together with the operation ID, to the performance information aggregation and recording unit 14. The performance information aggregation and recording unit 14 aggregates performance measurement results for each of the operation IDs.

The input image coordinate calculation module 54 transforms output image coordinates into input image coordinates using the transformation table, and outputs the input image coordinates as a transformation result to the image value interpolation operation module 55. The image value interpolation operation module 55 specifies the input address in the memory bus I/F 56 when receiving the input image coordinates, to access the memory 60. The memory bus I/F 56 reads out image data from an address specified by an input address in the memory 60, and feeds the read image data to the image value interpolation operation module 55.

The operation information estimation unit 42 acquires the input address when the memory bus I/F 56 has accessed the memory 60. The operation information estimation unit 42 judges that the third operation (op (3)) by the image value interpolation operation module 55 has currently been started by comparison with the address stored in the memory, and outputs the operation ID representing the operation to the performance measurement unit 13. As a result, the performance measurement unit 13 switches a performance measurement for the op (2) to a performance measurement for the op (3). The performance measurement unit 13 outputs a performance measurement result for the op (2), together with the operation ID, to the performance information aggregation and recording unit 14. The performance information aggregation and recording unit 14 aggregates performance measurement results for each of the operation IDs.

The image value interpolation operation module 55 subjects the input image to affine transformation using input image coordinates, and performs linear interpolation using a pixel value of an integer pixel position, to obtain transformed image data. The image value interpolation operation module 55 specifies the output address in the memory bus I/F 56, to access the memory 60. The memory bus I/F 56 writes the transformed image data as output image data into an address specified by the output address in the memory 60.

The operation information estimation unit 42 acquires the output address when the memory bus I/F 56 has accessed the memory 60. The operation information estimation unit 42 judges that the third operation (op (3)) by the image value interpolation operation module 55 has currently been finished by comparison with an address stored in the memory, and outputs a determination result to the performance measurement unit 13. As a result, the performance measurement unit 13 finishes a performance measurement for the op (3), and outputs a performance measurement result for the op (3), together with the operation ID, to the performance information aggregation and recording unit 14. The performance information aggregation and recording unit 14 aggregates performance measurement results for each of the operation IDs.

Accordingly, according to the present embodiment, a similar effect to the effect in each of the above-described embodiments can be obtained.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

Many of controls and functions described mainly in the flowchart in the technique herein described can be set by a program, and the above-described controls and functions can be implemented when a computer reads and executes the program. The whole or a part of the program can be recorded or stored as a computer program product in a portable medium such as a nonvolatile memory such as a flexible disk or a CD-ROM or a storage medium such as a hard disk or a volatile memory, and can be circulated or provided at the time of product shipment or via the portable medium or a communication line. A user can easily implement the processor performance measurement apparatus according to the present embodiment by downloading the program via a communication network and installing the program into the computer or installing the program into the computer from the recording medium.

What is claimed is:

1. A processor performance measurement apparatus comprising:
a processor,
wherein the processor
detects that a memory access occurs, the memory access being required to execute processing units or execute execution units by a processor to be measured, the memory access being associated with an operation ID, the processor to be measured being configured to implement a predetermined function by one or more processing units and one or more execution units required to execute the processing units, determines in a first estimation based on the operation ID whether the processing units or the execution units have switched to another processing unit of the one or more processing units or another execution unit of the one or more execution units, respectively, and identifies in a second estimation based on an address of an access destination of the memory access, which of the one or more processing units is being used for execution by the processor or which of the one or more execution units is being used for execution by the processor, measures respective performances in the processing units or the execution units based on an estimation result of the first estimation, and aggregates respective measurement results of the performances for each of the processing units based on an estimation result of the second estimation, wherein the first estimation and the second estimation is not based on the respective performances in the processing units or the execution units.

2. The processor performance measurement apparatus according to claim 1, wherein the processor to be measured achieves the predetermined function by a neural network, the processing units are respectively layers constituting the neural network, and the execution units are respectively instruction executions of the processor to be measured.

3. The processor performance measurement apparatus according to claim 2, wherein the processor to be measured stores in a register information for an instruction execution based on an instruction to implement the predetermined function, and the processor detects writing of information into the register, to perform the first estimation.

4. The processor performance measurement apparatus according to claim 3, wherein the processor to be measured stores in a register information for an instruction execution based on an instruction to implement the predetermined function, and the processor performs the second estimation based on at least one of an input/output address written into the register and a shape of the input/output and a weight address and a shape of the weight.

5. The processor performance measurement apparatus according to claim 1, wherein the processor to be measured implements affine transformation as the predetermined function, and the processing units are respectively one or more operation modules for implementing the affine transformation.

6. The processor performance measurement apparatus according to claim 5, wherein the processor detects the memory access by the processor to be measured, to perform the first estimation.

7. The processor performance measurement apparatus according to claim 6, wherein the processor performs the second estimation based on at least one of an input/output address and an affine transformation table address as the address of the access destination.

8. The processor performance measurement apparatus according to claim 1, wherein the processor to be measured implements the predetermined function while transferring data stored in a global memory to a local memory, and the processor performs address transformation between an address of the global memory and an address of the local memory, and then performs the second estimation.

9. A processor performance measurement apparatus comprising:

a processor, wherein the processor detects that a memory access occurs, the memory access being required to execute instruction executions by a processor to be measured, the memory access being associated with an operation ID, the processor to be measured being configured to implement a predetermined function by one or more instruction executions required to execute one or more layers constituting a neural network, determines in a first estimation based on the operation ID whether the one or more layers executed by the processor to implement the predetermined function has switched to another one or more layers of the neural network, and identifies in a second estimation which of the one or more layers is being used for the instruction execution based on an address of an access destination of the memory access, measures respective performances in the layers based on an estimation result of the first estimation, and aggregates respective measurement results of the performances for each of the layers based on an estimation result of the second estimation, wherein the first estimation and the second estimation is not based on the respective performances in the processing units or the execution units.

10. A processor performance measurement method comprising:

detecting that a memory access occurs, the memory access being required to execute processing units or execute execution units by a processor to be measured, the memory access being associated with an operation ID, the processor to be measured being configured to implement a predetermined function by one or more processing units and one or more execution units required to execute the processing units;

determining in a first estimation based on the operation ID whether the processing units or the execution units have switched to another processing unit of the one or more processing units or another execution unit of the one or more execution units, respectively, and identifying in a second estimation based on an address of an access destination of the memory access, which of the one or more processing units is being used for execution by the processor or which of the one or more execution units is being used for execution by the processor;

measuring respective performances in the processing units or the execution units based on an estimation result of the first estimation; and aggregating respective measurement results of the performances for each of the processing units based on an estimation result of the second estimation, wherein the first estimation and the second estimation is not based on the respective performances in the processing units or the execution units.

* * * * *